United States Patent [19]

Kiguchi

[11] Patent Number: 5,152,578
[45] Date of Patent: Oct. 6, 1992

[54] LEG STRUCTURE OF SEAT FOR ABSORBING IMPACT ENERGY

[75] Inventor: Shigeru Kiguchi, Kanagawa, Japan

[73] Assignee: Koito Industries, Ltd., Kanagawa, Japan

[21] Appl. No.: 598,636

[22] Filed: Dec. 21, 1990

[30] Foreign Application Priority Data

Feb. 23, 1989 [JP] Japan .................................. 1-41656

[51] Int. Cl.⁵ .............................................. B60N 2/42
[52] U.S. Cl. .................... 297/216; 297/472; 188/371; 244/122 R
[58] Field of Search ............... 297/216, 471, 472; 188/371; 296/65.1; 244/122 R

[56] References Cited

U.S. PATENT DOCUMENTS

| | | | |
|---|---|---|---|
| 2,682,931 | 7/1954 | Young | 297/216 X |
| 3,603,638 | 9/1971 | McGregor | 297/216 |
| 4,349,167 | 9/1982 | Reilly | 297/216 X |
| 4,718,719 | 1/1988 | Brennan | 297/216 |
| 4,861,103 | 8/1989 | Vallee | 297/216 |
| 4,911,381 | 3/1990 | Cannon et al. | 297/216 X |

FOREIGN PATENT DOCUMENTS 1904687 9/1970 Fed. Rep. of Germany ...... 297/216

*Primary Examiner*—Laurie K. Cranmer
*Attorney, Agent, or Firm*—Sughrue, Mion, Zinn, Macpeak & Seas

[57] ABSTRACT

A front leg (1) is formed by an upright support rod extending vertically above a fixing stud (8), a rear leg (2) is formed by both a lower support rod (2a) extending on a diagonal line joining the upper end of the front leg and the lower end of the rear leg and an upper support rod (2b) contiguous to the lower support rod (2a) in an upper position relative to the lower support rod, the upper support rod (2b) being curved arcuately and inclined rearwardly upwards, and an energy absorber (12) is mounted bridgewise as a diagonal member between the upper end portion of the front leg and the lower end portion of the rear leg, to constitute a leg structure. Accordingly to this leg structure, a striking energy is absorbed by an anti-plastic deformation force induced when the rear leg (2) and the energy absorber (12) is deformed plastically under an impact larger than a predetermined value, and the seat is held at its supported posture in normal use. This leg structure can be utilized not only in aircraft but also in automobiles and railway vehicles.

6 Claims, 4 Drawing Sheets

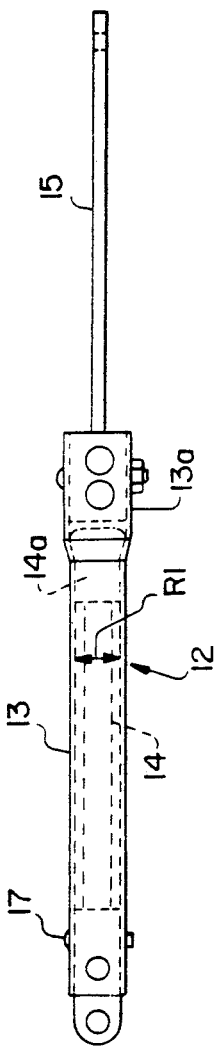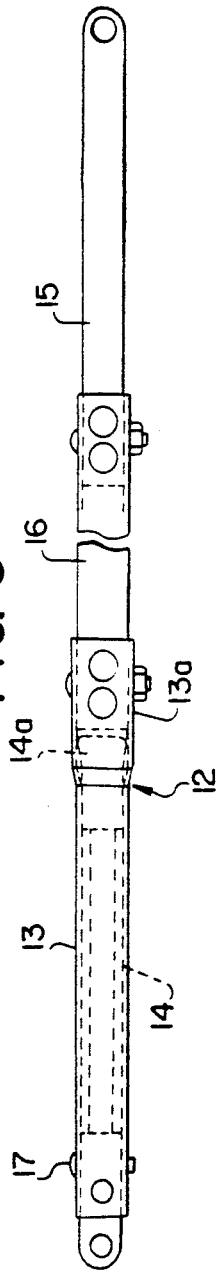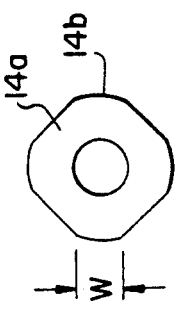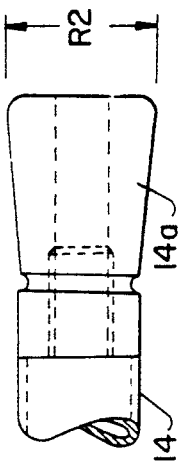

LEG STRUCTURE OF SEAT FOR ABSORBING IMPACT ENERGY

FIELD OF ART

The present invention relates to a technique for absorbing a striking energy exerted on a seat and particularly to a striking energy absorbing seat leg structure capable of absorbing an impact load generated upon accident of a vehicle or an aircraft.

BACKGROUND ART

Various seat shock absorbers have been used heretofore. For example, a striking energy generated in the event of failure in landing of an airplane is mostly absorbed by a shock absorber provided on the airplane body side. In the event of automobile collision, the resulting striking energy is absorbed by a shock absorber provided between a bumper and the chassis.

In a landing failure accident of an airplane or in an automobile collision accident, however, there sometimes is generated an impact load exceeding the impact absorbing ability of a shock absorber, and in this case a too large impact load is applied to passengers. As the seat particularly in aircraft, in order to absorb such striking energy, there has been used a seat having a striking energy absorbing member constituted by a cylindrical body of a synthetic resin-carbon fiber composite and functioning to absorb energy through a crushing load of the said member obtained by suitable arrangement and proportion of the carbon fibers used.

In the above striking energy absorbing member in such conventional seat, however, it is difficult to determine the structure of the synthetic resin - carbon fiber composite in a physical-propertywise manner and there arise variations in the product accuracy so it is difficult to make production control. Consequently, it is impossible to stably ensure a constant amount of energy absorbed. Further, most of the components, including the seat leg structure, are formed using undeformable materials, so coupled with structural characteristics of the foregoing striking energy absorbing member, it is impossible to take a sufficient seat moving stroke for the absorption of striking energy.

The present invention has solved the above-mentioned problems and it is the object thereof to provide a striking energy absorbing seat leg structure which is simple and capable of forming a sufficient stroke for the absorption of striking energy, affording a stable amount of energy absorbed, and contributing to the reduction in weight of seats particularly in an airplane.

DISCLOSURE OF THE INVENTION

According to the striking energy absorbing seat leg structure of the present invention, lower end portions of front and rear legs are supported pivotably in the longitudinal direction through fixing studs, and a seat bottom and a seat back are rested on front and rear beams mounted to the upper portions of the front and rear legs, to constitute a seat. The front leg is constituted by an upright support rod extending vertically above the associated fixing stud, while the rear leg is constituted by a lower support rod extending on a diagonal line joining the upper end portion of the front leg and the lower end portion of the rear leg and an upper support rod contiguous to the lower support rod in an upper position relative to the lower support rod, the upper support rod being curved arcuately and inclined rearwardly upwards. Further, an energy absorber is mounted as a diagonal member bridgewise between the upper end portion of the front leg and the lower end portion of the rear leg. At least the rear leg is formed of a material capable of being deformed forwards when an impact larger than a predetermined load is applied thereto from behind. The upper support rod of the rear leg is inclined backwards so that the upper end thereof is normally positioned on a perpendicular line extending upwards from the lower end portion of the rear leg or positioned forward with respect to the said perpendicular line.

The above energy absorber is composed of two members capable of being slidably fitted with respect to each other. According to the structure thereof, an impact resisting force is generated by the loss of mechanical energy during sliding, and the energy absorber is extended its overall length at the time of impact absorption.

More specifically, the energy absorber in question comprises two members one of which is an outer tube and the other is an inner tube inserted into the outer tube. The outer tube is partially formed with a larger diameter portion, and the inner tube is mounted so that an expansion member of a desired truncated cone shape such as a circular truncated cone or a frustum of pyramid fixed to one end of the inner tube and having a maximum size portion larger than the inside diameter of the outer tube is fitted in the said larger diameter portion of the outer tube. The rear end of the energy absorber is fixed to an upper end part of the lower support rod of the rear leg so as to form a diagonal line on an extension of the lower support rod with respect to the upper portion of the front leg.

Further, a flexurally deformable plate-like joint member is connected to the rear end of the energy absorber, and through this joint member the rear end of the energy absorber is fixed pivotably to the lower portion of the rear leg.

A base frame or the front and rear beams mounted on the upper portions of the front and rear legs, on which are rested a seat bottom and a seat back, are supported on the upper ends of both legs so that they can turn in the longitudinal direction and adapted to move forward in such a manner as to crush the front and rear legs when impact is applied thereto.

According to the striking energy absorbing seat leg structure of the present invention, as indicated by a dash-double dot line in FIG. 1, when an impact load is applied to the seat, the rear leg extends forward, and in the event the load imposed on the energy absorber exceeds a predetermined value, say, 12G, a fuse pin is cut, allowing the absorber to be extended its overall length. The energy absorber turns while extending substantially in its axial direction which is diagonal to the direction of impact to be absorbed and along the pivoting direction of the front leg, to absorb the impact load in the direction of pull.

That is, the impact load applied to the leg structure is absorbed by the loss of mechanical energy through a plastic deformation induced by the extension of the rear leg and also through a plastic deformation induced by the extension of the energy absorber.

The seat, when impact is applied thereto, moves in the direction of the impact in such a manner as to crush the leg structure, but since it turns while maintaining the seat surface substantially in its original horizontal posture, the passenger on the seat can keep the sitting posture.

BRIEF DESCRIPTION OF THE DRAWINGS

FIG. 7 is a front view showing the structure of an energy absorber;

FIG. 8 is a partially omitted plan view showing another structure of an energy absorber;

FIG. 9 is an enlarged side view of a principal portion, showing an example of shape of a larger diameter portion in the energy absorber; and FIG. 10 is a front view thereof.

BEST FORM FOR PRACTISING THE INVENTION

Figure 1:
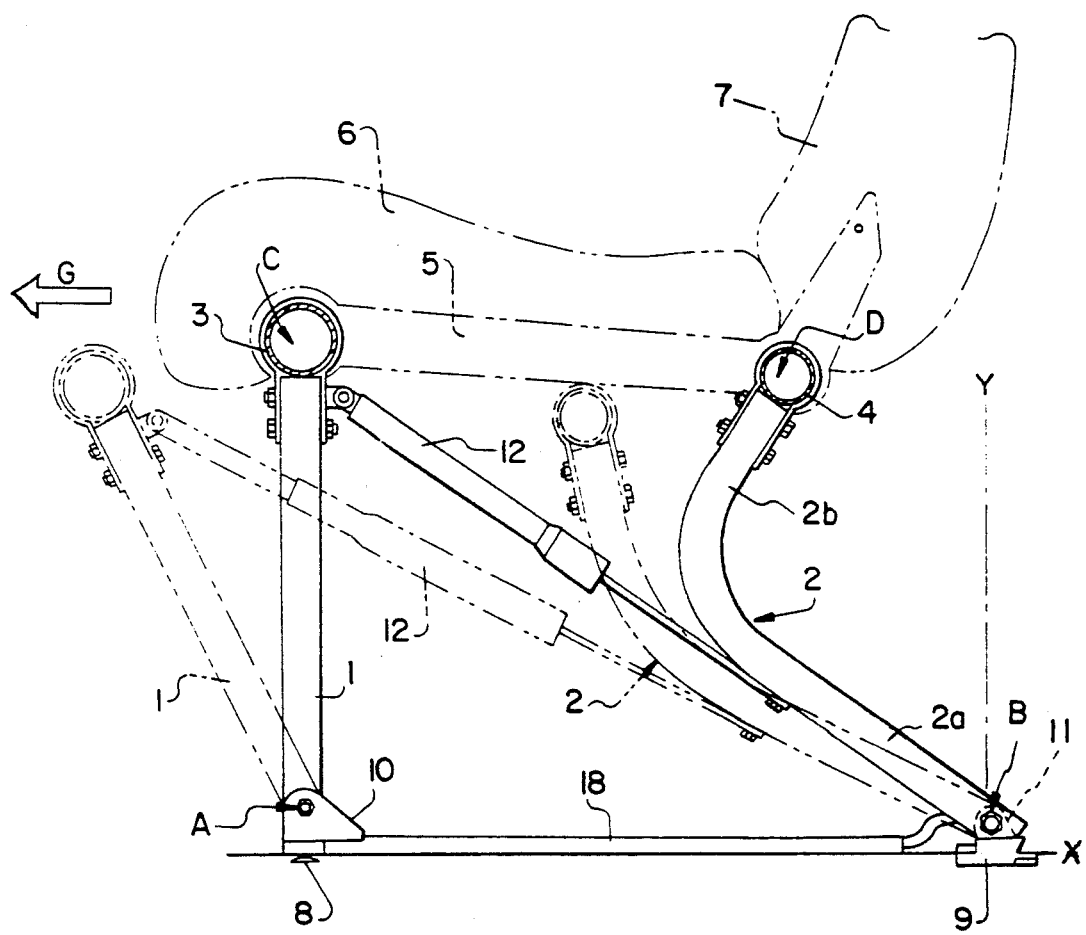
FIG. 1 is a side view of a principal portion, showing a striking energy absorbing seat leg structure embodying the invention.

Preferred embodiments relating to the striking energy absorbing seat leg structure of the present invention will be described hereinunder with reference to the drawings.

The seat according to the present invention is constituted by mounting front and rear beams 3, 4 on front and rear legs 1, 2, mounting a base frame 5 bridgewise between the front and rear beams 3, 4, and resting a seat bottom 6 and a seat back 7 on the front and rear beams 3, 4 and the base frame 5. The seat back 7 is supported tiltably backwards from the seat through a suitable reclining device (not shown).

Figure 2:
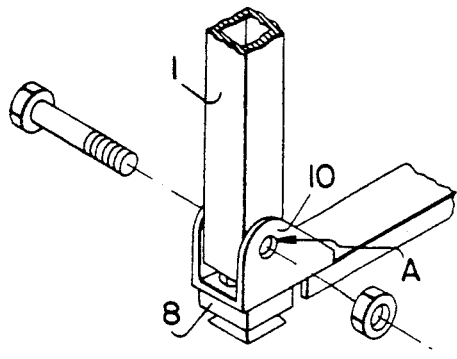
FIG. 2 is an enlarged perspective view of a principal portion relating to a method for fixing a lower end portion of a front leg.
Figure 3:
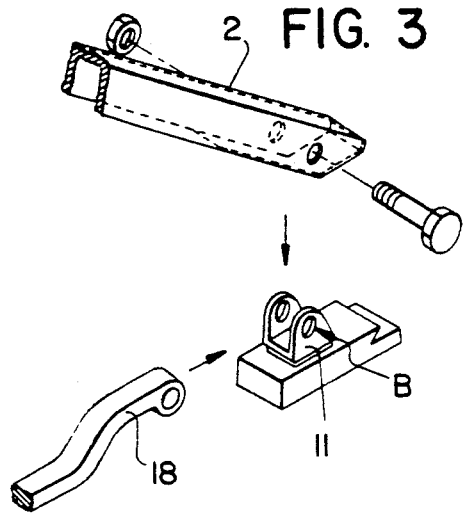
FIG. 3 is an enlarged perspective view of a principal portion relation to a method for fixing a lower end portion of a rear leg.

Lower end portions of the front and rear legs 1, 2 of the seat constructed as above are fixed to a stationary structure (not shown) such as a rail on a floor surface X through fixing studs 8 and 9, respectively, and are supported pivotably in the longitudinal direction relative to brackets 10 and 11 on the studs 8 and 9 (see arrow A, B portions in FIGS. 2 and 3). The front leg 1 is formed by an upright support rod extending vertically above the fixing stud 8, while the rear leg 2 is formed by both a lower support rod 2a extending on a diagonal line joining the upper end portion of the front leg 1 and the lower end portion of the rear leg 2 and an upper support rod 2b contiguous to the lower support rod 2a in an upper position relative to the lower support rod, the upper support rod 2b being curved arcuately so as to project forwardly of the rear leg and then inclined rearwardly upwards. Further, an energy absorber 12 is mounted as a diagonal member bridgewise between the upper end portion of the front leg 1 and the lower end portion of the rear leg 2, and at least the front-side fixed portion is fixed through a shaft so as to be pivotable for the upper end portion of the front leg 1.

In the seat leg structure of the present invention, moreover, at least the rear leg 2 is formed using a material which is flexurally deformable forward, or in the direction of impact, in the event an impact load larger than a predetermined load is applied thereto from behind (the leg structure is deformed to the dash-double dot line positions in the direction of arrow G). It may be formed using a pipe or the like. Further, the rear leg 2 is curved and inclined arcuately and rearwardly upwards so that the upper end of the upper support rod 2b as a constituent of the rear leg is positioned on or before a perpendicular line Y extending upwards from the lower end portion of the rear leg 2 in the seat posture in normal use. Such a shape of the rear leg 2 prevents a downward buckling of the rear leg and permits the rear leg to be easily deformed flexurally forward.

Figure 4:
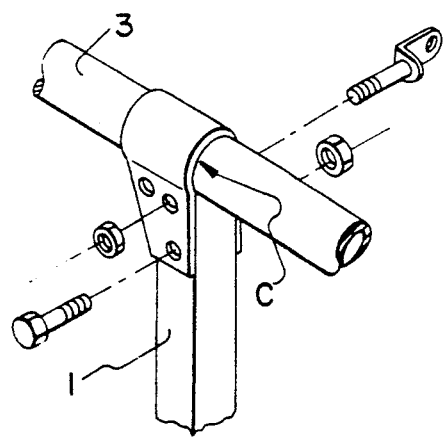
FIG. 4 is a perspective view of a principal portion relating to a method for fixing an upper end portion of a front leg.
Figure 5:
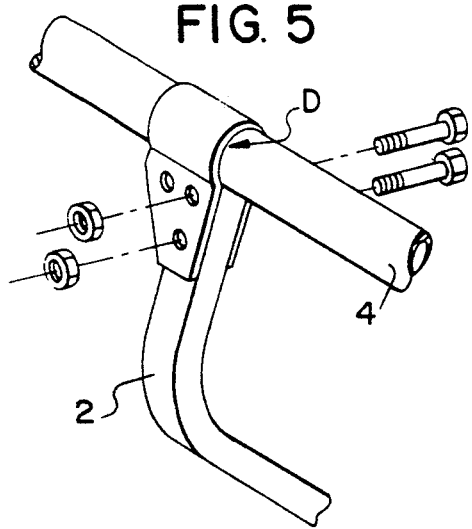
FIG. 5 is a perspective view of a principal portion relating to a method for fixing an upper end portion of a rear leg.
Figure 6:
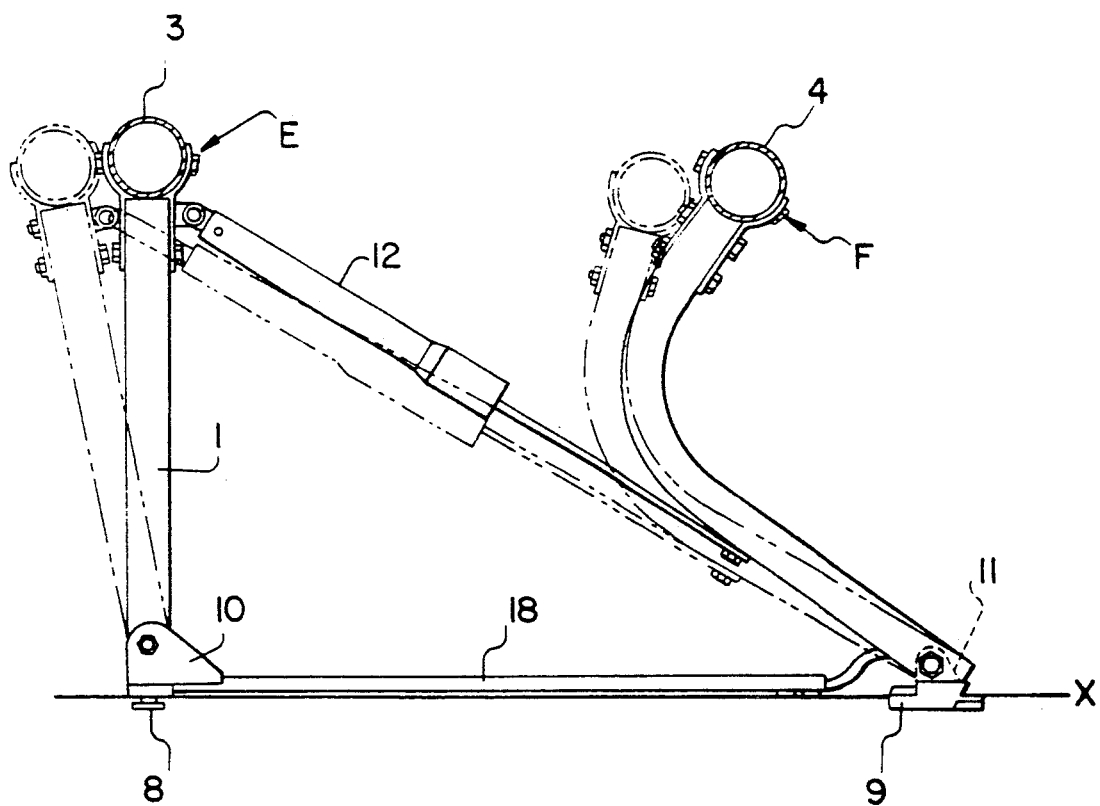
FIG. 6 is a side view of a principal portion, showing another relating to a leg structure.

In the present invention, the seat components such as the seat bottom 6 and the seat back 7 provided on the leg structure are supported so that they can substantially retain the seat posture in normal use even in the event of deformation of the leg structure. The upper ends of the front and rear legs 1, 2 are mounted to permit longitudinal turning motions at the arrow C portion (see FIG. 4) and D portion (see FIG. 5) for the front and rear beams 3, 4, respectively. In the case where the amount of striking energy absorbed may be small, the front and rear beams 3, 4 mounted on the front and rear legs 1, 2 may be fixed by a mounting method not permitting such turning motions of both beams (arrows E and F), as shown in FIG. 6.

As a mechanism for keeping the seat supporting posture in normal use, a stop (not shown) may be formed at the lower end portion of the rear leg 2 to prevent the rear leg from pivoting forward, or the pivoted portions of the lower ends of the front and rear legs 1, 2 may be fixed by a clamping force to prevent the pivotal motions of both legs when the load imposed thereon is smaller than a predetermined value.

FIGS. 7 to 10 show an example of the energy absorber 12. This energy absorber comprises two members fitted together slidably. An impact resisting force is generated by the loss of mechanical energy during sliding, and the energy absorber is extended its overall length as it absorbs a striking energy. More specifically, one of the two members which constitute the energy absorber 12 is a metallic outer tube 13 having a larger diameter portion 13a and the other is an inner tube 14 inserted slidably into the outer tube 13. The inner tube 14 is mounted so that an expansion member 14a of a desired truncated cone shape such as a circular truncated cone or a frustum of pyramid having a maximum size part R2 (R1<R2) larger than the inside diameter R1 of the outer tube 13, and fixed to one end of the inner tube 14, is inserted into the larger diameter portion 13a of the outer tube 13. A rear-side fixing portion of the energy absorber 12 is fixed to an upper end face of the lower support rod 2a so as to serve as a diagonal line extending on an extension line of the lower support rod up to the upper end of the front leg 1. An anti-plastic deformation force of the larger diameter portion 13a induced by the expansion member 14a can be adjusted by changing a contact size W of a contact surface 14b of the expansion member 14a which is in contact with the inner surface of the larger diameter portion 13a. It can be changed designwise according to a working load for striking energy absorption required for each seat. To the rear-side fixing portion of the energy absorber 12 there is connected a flexurally deformable plate-like joint member 15 and through this joint member the rear side of the energy absorber is fixed to the lower end side of the rear leg 2. In this embodiment, the rear end of the energy absorber 12 is fixed to an upper end face of the lower support rod 2a as a constituent of the rear leg 2, thereby absorbing a downward flexural deformation of the energy absorber 12 in the event of plastic deformation of the rear leg 2 in the direction of impact when an impact load is applied to the seat, and allowing the energy absorber 12 to operate always normally in the axial direction. The joint member 15 may be connected to the outer tube 13 through a relay member 16, as shown in FIG. 8.

In the energy absorber 12 used in the present invention, the two members, namely, the outer tube 13 and the inner tube 14, are fixed with a fuse pin 17 extending across both tubes and capable of resisting a tensile load not higher than a predetermined value. Thus, the energy absorber 12 is of a structure wherein at a normal working load there is imposed no load on the operating portion of the energy absorber, and the absorber functions as a diagonal member of the seat leg structure without deterioration in its performance. Numeral 18 denotes a brace extending between the front and rear legs 1, 2.

In the striking energy absorbing seat leg structure of the present invention constructed as above, the energy absorber can be allowed to function as a diagonal member of the leg structure while the seat is in normal use, so it is not necessary to constitute a special energy absorber separately. Consequently, not only the increase of the seat weight can be avoided but also since the leg structure of the invention is almost the same as the conventional structure it can be obtained easily by modifying the conventional structure. Further, when an impact load higher than a predetermined value is applied to the seat, the striking energy can be absorbed with a large stroke under a mechanical energy absorbing action induced by plastic deformations of the leg structure and the energy absorber. There are attained such extremely superior effects by the seat leg structure of the invention.

Industrial Utilizability

As concrete applications, the striking energy absorbing seat leg structure of the present invention can be used in aircraft, automobiles and railway vehicles. It absorbs an impact load upon occurrence of an accident, thereby contributing the ensuring the passenger's safety.

What is claimed is:

1. In a striking energy absorbing seat leg structure wherein lower end portions of front and rear legs are supported pivotably through fixing studs, and a seat bottom and a seat back are rested on front and rear beams mounted on upper portions of said front and rear legs to constitute a seat, the improvement characterized in that said front leg is formed by an upright support rob extending vertically above the associated fixing stud, said rear leg is formed by a lower support rod extending on a diagonal line joining an upper end portion of said front leg and a lower end portion of the rear leg and an upper support rod contiguous to said lower support rod in an upper position relative to the lower support rod, said upper support rod being curbed arcuately and inclined rearwardly upwards, and an energy absorber is mounted as a diagonal member bridgewise between the upper end portion of the front leg and the lower end portion of the rear leg, said energy absorber being coupled to said upper end portion of said front leg through a pin joint and to said lower end portion of said rear leg through a flexurally deformable plate-like joint member, said rear leg being constituted by a material which is flexurally deformable in a direction tending to straighten said rear leg when said rear leg receives an impact larger than a predetermined load, whereby said joint member deforms during an impact corresponding to deformation of said rear leg so than an axial load is maintained on said energy absorber during impact, both ends of said energy absorber move during an impact, and said seat bottom remains substantially horizontal during said impact due to simultaneous flexural deformation of said rear leg and extension of said energy absorber.

2. A striking energy absorber seat leg structure according to claim 1, wherein said upper support rod as a constituent of the rear leg is inclined rearwardly upward so that the upper end thereof is positioned on or forwardly of a perpendicular line extending upward from the lower end portion of the rear leg.

3. A striking energy absorbing seat leg structure according to claim 1, wherein said energy absorber comprises two members fitted together slidably, generates an impact resisting force through the loss of mechanical energy during sliding, and is extended its overall length at the time of impact absorption.

4. A striking energy absorbing seat leg structure according to claim 3, wherein said two members constituting said energy absorber are a metallic outer tube having a larger diameter portion and an inner tube inserted slidably into said outer tube, and said outer tube is mounted so that an expansion member having a truncated cone shape having a maximum size portion larger than the inside diameter of said outer tube, and fixed to one end of the inner tube, is inserted into said larger diameter portion of the outer tube.

5. A striking energy absorbing seat leg structure according to claim 1, 3, or 4, wherein a rear end portion of said energy absorber is fixed to an upper end face of said lower support rod of said rear leg so as to form a diagonal line on an extension line of the lower support rod with respect to the upper portion of said front leg.

6. A striking energy absorbing seat leg structure according to claim 1, wherein a base frame or said front and rear beams mounted on the upper portions of said front and rear legs, with said seat bottom and seat back resting thereon, are supported for turning motion on the upper ends of the front and rear legs.

* * * * *